(12) United States Patent
Sagara et al.

(10) Patent No.: US 11,048,242 B2
(45) Date of Patent: *Jun. 29, 2021

(54) PRODUCTION SCHEDULE CREATING METHOD AND PRODUCTION SCHEDULE CREATING APPARATUS

(71) Applicant: Panasonic Intellectual Property Management Co., Ltd., Osaka (JP)

(72) Inventors: Hiroki Sagara, Fukuoka (JP); Hirokazu Takehara, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

This patent is subject to a terminal disclaimer.

(21) Appl. No.: 16/351,864

(22) Filed: Mar. 13, 2019

(65) Prior Publication Data
US 2019/0302748 A1 Oct. 3, 2019

(30) Foreign Application Priority Data
Mar. 30, 2018 (JP) .............................. JP2018-067339

(51) Int. Cl.
*G05B 19/418* (2006.01)
(52) U.S. Cl.
CPC .......... *G05B 19/41865* (2013.01); *G05B 2219/34418* (2013.01); *G05B 2219/45026* (2013.01)
(58) Field of Classification Search
USPC ....................................................... 700/100
See application file for complete search history.

(56) References Cited

U.S. PATENT DOCUMENTS

| 5,826,236 | A  | * | 10/1998 | Narimatsu | ............. | G06Q 10/06 705/7.24 |
| 6,795,742 | B1 | * | 9/2004  | Ichikawa  | ............... | G06Q 10/06 700/97 |
| 2003/0105543 | A1 | * | 6/2003 | Muramatsu | ...... | G05B 19/41865 700/103 |
| 2006/0212323 | A1 | * | 9/2006 | Ninomiya | ........ | G06Q 10/06312 705/7.22 |

(Continued)

FOREIGN PATENT DOCUMENTS

JP  2010-244506  10/2010

*Primary Examiner* — Md Azad
(74) *Attorney, Agent, or Firm* — Pearne & Gordon LLP

(57) ABSTRACT

A production schedule creating method includes: a schedule information acquiring step of acquiring production schedule information including a production sequence for producing a plurality of models of products, a commenceable time point, and a production deadline time point; a preparation time calculating step of calculating a preparation time taken for arrangement work of arranging members on arrangement means, for each of a plurality of models; a production time point calculating step of calculating a production commencing time point and a production end time point for each of the plurality of models; a schedule satisfaction determining step of determining whether or not a schedule satisfying condition is satisfied, for each of the plurality of models; and a sequence changing step of changing a sequence for producing an unsatisfied model that does not satisfy the schedule satisfying condition, in a case where the unsatisfied model is present.

18 Claims, 12 Drawing Sheets

(56) References Cited

U.S. PATENT DOCUMENTS

2015/0261216 A1* 9/2015 Yasuma ........... G05B 19/41865
                                                    700/100
2019/0049935 A1* 2/2019 Ikeda ............... G05B 19/41805
2019/0228360 A1* 7/2019 Aoyama ................ G06Q 50/04

* cited by examiner

| LOT NUMBER | MODEL NUMBER | GROUP NUMBER | NUMBER OF MEMBERS | NUMBER OF PRODUCTION |
|---|---|---|---|---|
| A | X1 | G1 | 95 | 250 |
| B | X3 | G2 | 110 | 300 |
| C | X2 | G1 | 95 | 380 |
| D | X4 | G3 | 98 | 200 |
| E | X6 | G4 | 114 | 350 |
| F | X5 | G5 | 101 | 300 |
| G | X7 | G5 | 115 | 350 |
| ↑ 41 | ↑ 42 | ↑ 43 | ↑ 44 | ↑ 45 |

| WORK CONTENT | UNIT WORK QUANTITY |
|---|---|
| DETACHMENT OF TAPE FEEDER FROM CARRIAGE | 0.3 (PERSONS·MINUTES) |
| ATTACHMENT OF TAPE FEEDER TO CARRIAGE | 1.0 (PERSONS·MINUTES) |
| CHECKING OF TAPE FEEDER AND REEL | 0.2 (PERSONS·MINUTES) |
| ↑ 51 | ↑ 52 |

PRODUCTION SCHEDULE CREATING METHOD AND PRODUCTION SCHEDULE CREATING APPARATUS

BACKGROUND

1. Technical Field

The present disclosure relates to a production schedule creating method and a production schedule creating apparatus for creating a production schedule for producing a product in a production line.

2. Description of the Related Art

A plurality of models of products are produced on a production line for producing a product such as a mounting board with an electronic component mounted on the board. When a model of a product to be produced is changed, set-up changing of changing a member that is used for producing a product in the production line is performed. The set-up changing includes an external set-up that is performed in a place other than the production line in parallel with the production of the product, in addition to an internal set-up that is performed in the production line. When a production schedule for producing a plurality of models of products is created, a schedule in which a product can be produced within a delivery date is created, also with consideration for a preparation schedule of set-up changing or the like (for example, Japanese Patent Unexamined Publication No. 2010-244506).

In a production schedule creating apparatus disclosed in Japanese Patent Unexamined Publication No. 2010-244506, a production schedule is created such that a furnace washing process (set-up changing) of diluting a residue is performed in a case where the residue of a previously manufactured alloy influences a composition of an alloy to be manufactured next during manufacturing of alloys (products) having different compositions from each other in a melting furnace (production equipment) in sequence.

SUMMARY

According to the present disclosure, there is provided a production schedule creating method used in a production schedule creating apparatus that creates a production schedule in a production line for producing a plurality of models of products, the method including: a schedule information acquiring step of acquiring production schedule information including a production sequence for producing the plurality of models of products, a commenceable time point when production of the plurality of models of products is commenceable, and a production deadline time point; a preparation time calculating step of calculating a preparation time taken for arrangement work of arranging members corresponding to the plurality of models on arrangement means which is attached to the production line so as to arrange the members that are used for production of the products, for each of the plurality of models, based on the production sequence; a production time point calculating step of calculating a production commencing time point and a production end time point for each of the plurality of models, based on the production sequence and the preparation time; a schedule satisfaction determining step of determining whether or not a schedule satisfying condition that the production commencing time point is later than the commenceable time point and the production end time point is earlier than the production deadline time point is satisfied, for each of the plurality of models; and a sequence changing step of changing a sequence for producing an unsatisfied model that does not satisfy the schedule satisfying condition, in a case where the unsatisfied model is present.

According to the present disclosure, there is provided a production schedule creating apparatus that creates a production schedule in a production line for producing a plurality of models of products, the apparatus including: a schedule information acquirer that acquires production schedule information including a production sequence for producing the plurality of models of products, a commenceable time point when production of the plurality of models is commenceable, and a production deadline time point; a preparation time calculator that calculates a preparation time taken for arrangement work of arranging members corresponding to the plurality of models on arrangement means which is attached to the production line so as to arrange the members that are used for production of the products, for each of the plurality of models, based on the production sequence; a production time point calculator that calculates a production commencing time point and a production end time point for each of the plurality of models, based on the production sequence and the preparation time; a schedule satisfaction determiner that determines whether or not a schedule satisfying condition that the production commencing time point is later than the commenceable time point and the production end time point is earlier than the production deadline time point is satisfied, for each of the plurality of models; and a sequence changer that changes a sequence for producing an unsatisfied model that does not satisfy the schedule satisfying condition, in a case where the unsatisfied model is present.

In the present disclosure, it is possible to create a production schedule for producing a plurality of models of products satisfying a limiting condition.

BRIEF DESCRIPTION OF THE DRAWINGS

FIG. 6 is a diagram of an example of lot information that is used in the managing computer (production schedule creating apparatus) of the exemplary embodiment of the present disclosure;

FIG. 7 is a diagram of an example of unit work quantity information that is used in the managing computer (production schedule creating apparatus) of the exemplary embodiment of the present disclosure;

DETAILED DESCRIPTION

In a production schedule creating apparatus disclosed in Japanese Patent Unexamined Publication No. 2010-244506, a production schedule is created in a condition that production of a product and set-up changing are not temporally overlapped. However, the production schedule creating apparatus has many limiting conditions that the production of the product can be performed in parallel with the set-up changing or work cannot be started when production of a product is not completed. Problems arise in that a long time is taken to create a production schedule for producing a plurality of models of products with consideration for the limiting conditions and it is difficult to create an optimal production schedule.

In this respect, an object of the present disclosure is to provide a production schedule creating method and a production schedule creating apparatus that can create a production schedule for producing the plurality of models of products satisfying the limiting conditions.

Figure 3:
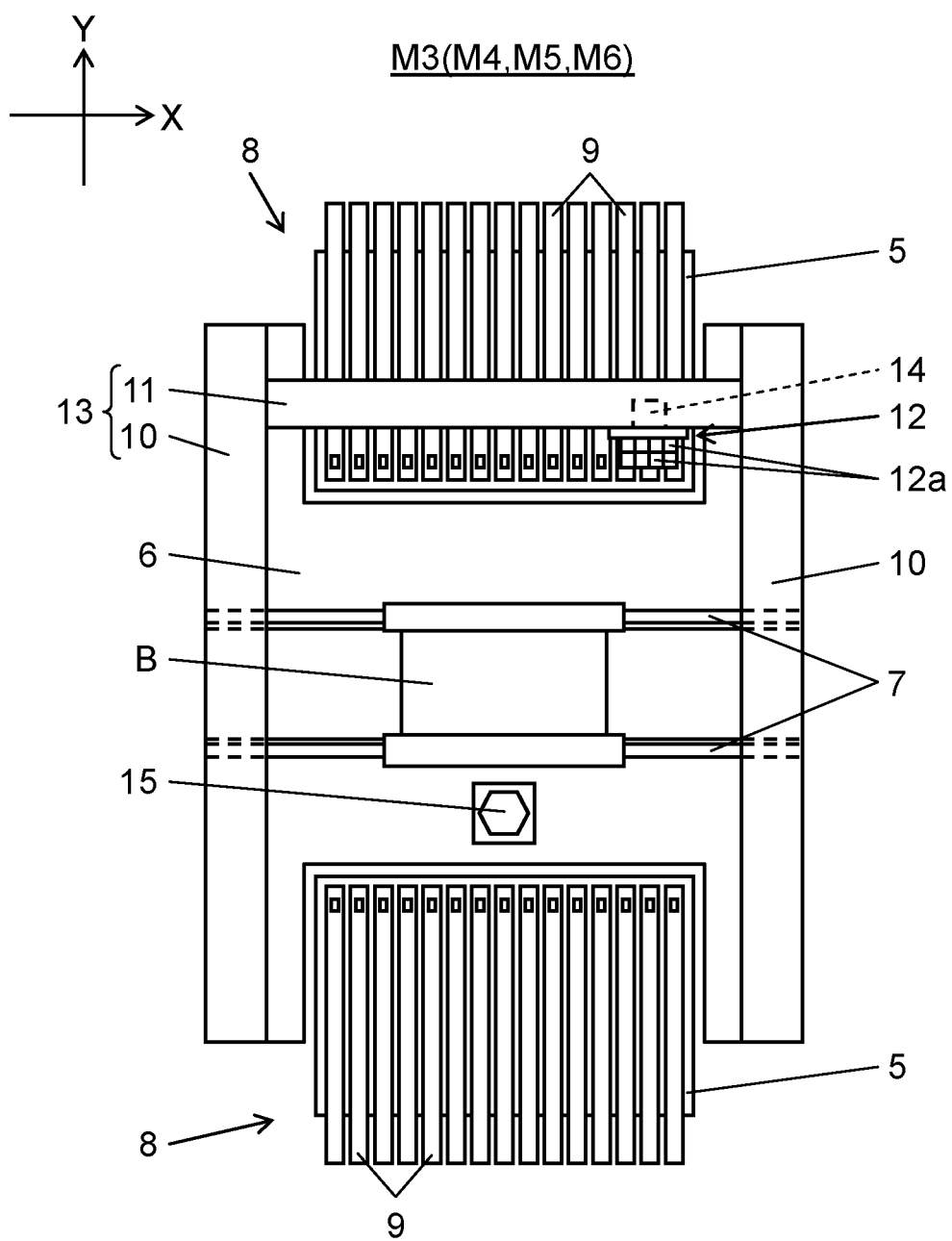
FIG. 3 is a plan view of a component mounter included in the component mounting system of the exemplary embodiment of the present disclosure.
Figure 4:
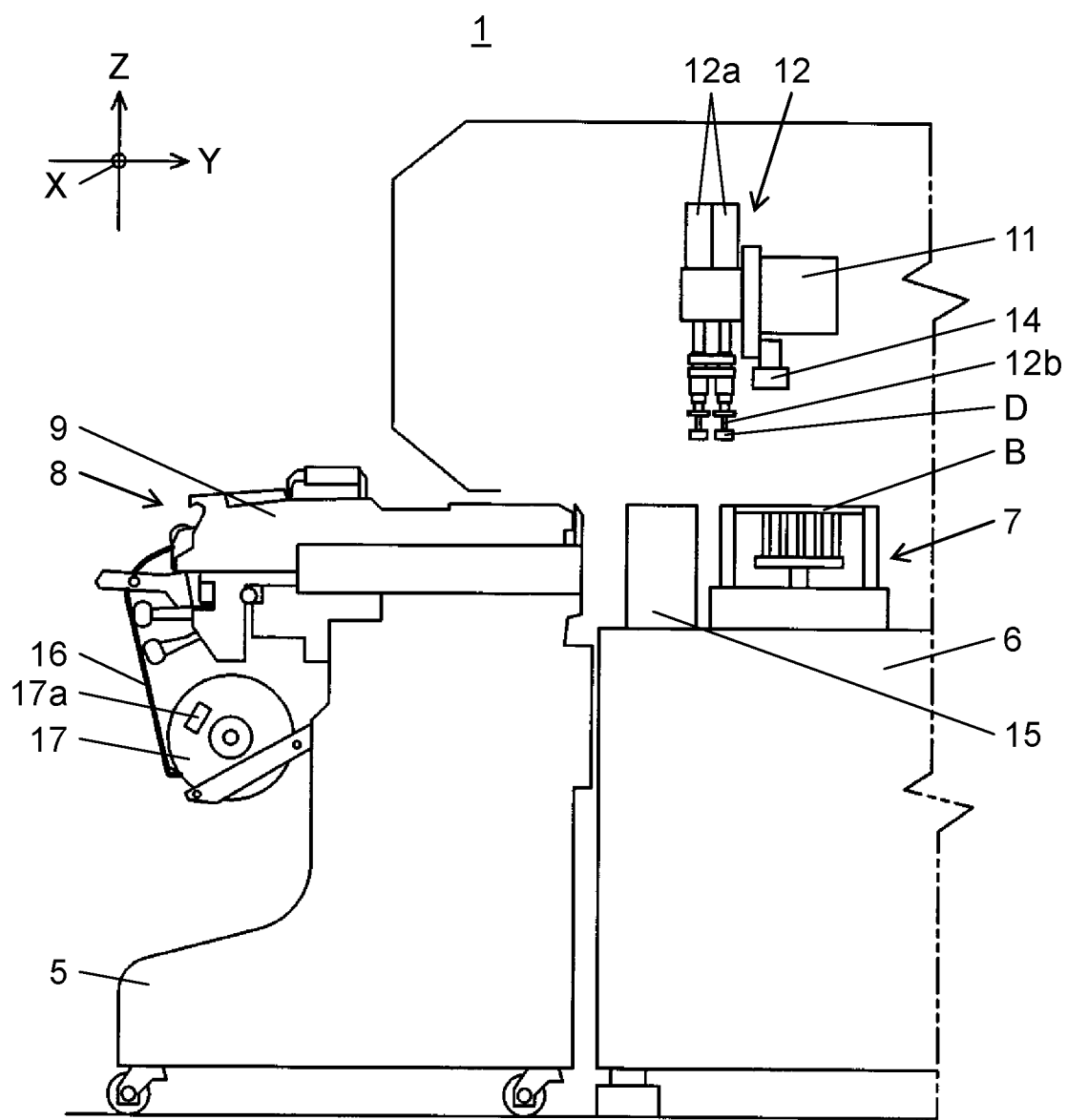
FIG. 4 is a partial sectional view of the component mounter included in the component mounting system of the exemplary embodiment of the present disclosure.

Hereinafter, exemplary embodiments of the present disclosure will be described in detail with reference to the drawings. A configuration, a shape, or the like to be described below, is an example for providing the description and can be appropriately modified according to specifications of a component mounting system, a component mounting line, a component mounter, and a carriage. Hereinafter, the same reference signs are assigned to corresponding elements in all of the drawings, and thus repeated description thereof is omitted. In FIG. 3 and a part of the following description, an X direction (right-left direction in FIG. 3) of a board transporting direction and a Y direction (vertical direction in FIG. 3) orthogonal to the board transporting direction are illustrated as two axial directions which are orthogonal to each other in a horizontal plane. In FIG. 4, a Z direction (vertical direction in FIG. 4) is illustrated as a height direction orthogonal to the horizontal plane. The Z direction is the vertical direction or an orthogonal direction in a case where the component mounter is installed on a horizontal plane.

First, a configuration of component mounting system 1 is described with reference to FIG. 1. Component mounting system 1 has a configuration in which three component mounting lines L1 to L3 arranged on floor F are connected to each other via communication network 2 and managing computer 3 manages the three component mounting lines.

Component mounting lines L1 to L3 are arranged in production area Ap provided on floor F. Component mounting lines L1 to L3 are configured of a plurality of connected pieces of production equipment including the component mounter as will be described below and have a function of producing a mounting board having a configuration in which an electronic component is mounted on a board. There is no need to provide three component mounting lines L1 to L3 in component mounting system 1, and two and four or more component mounting lines may be provided.

Arrangement work supporting device 4 is disposed in preparation area As different from production area Ap provided on floor F. Arrangement work supporting device 4 is connected to managing computer 3 via communication network 2. Carriage 5 for replacement, which is a target of arrangement work to be described below, is connected to arrangement work supporting device 4. A plurality of carriages 5 having various statuses such as before, while, or after the arrangement work is performed are stored in preparation area As.

Figure 1:
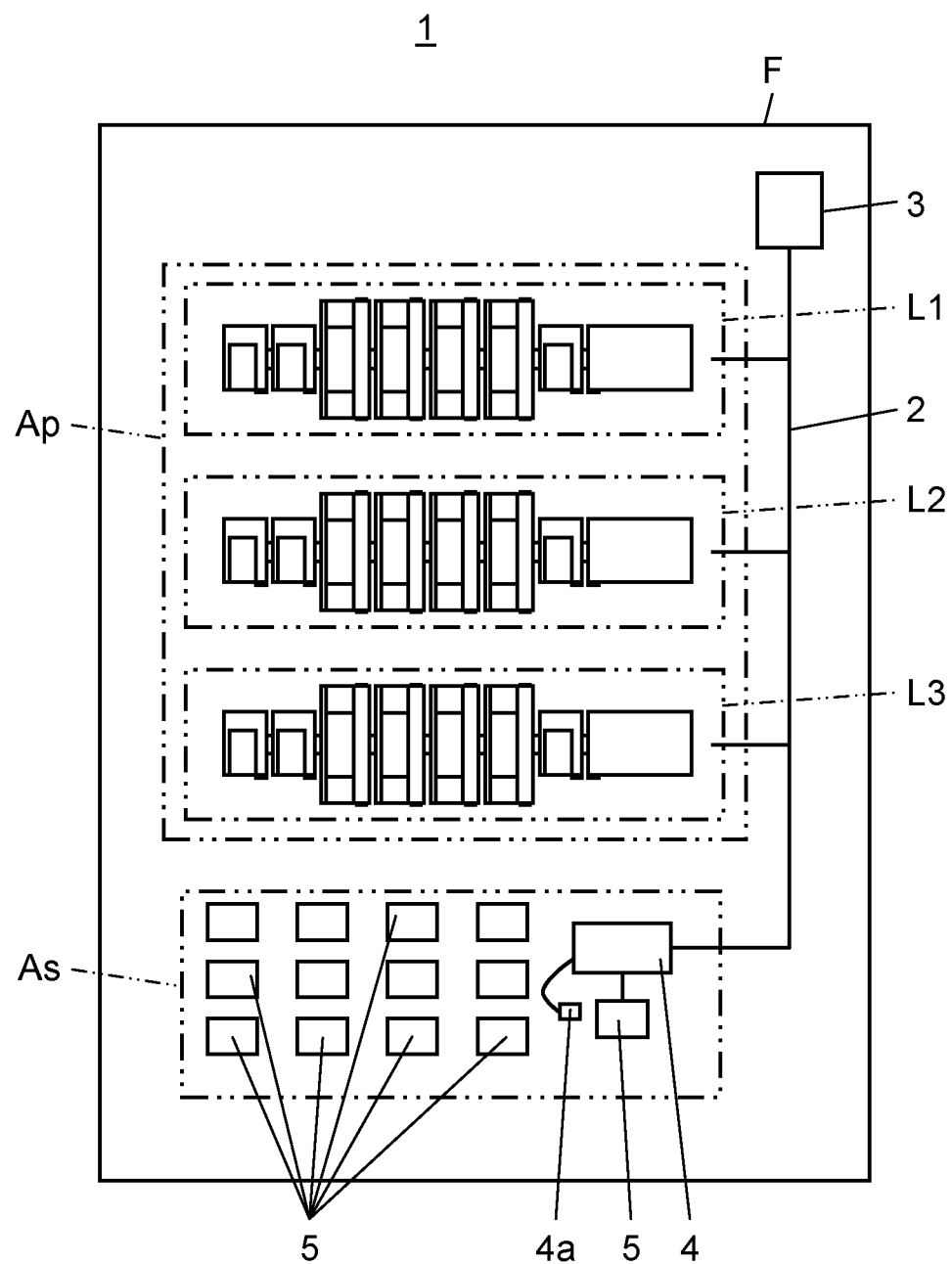
FIG. 1 is a diagram for illustrating a configuration of a component mounting system of an exemplary embodiment of the present disclosure.

In FIG. 1, on carriage 5 connected to arrangement work supporting device 4, a worker performs the arrangement work of installing a plurality of tape feeders 9 (refer to FIG. 3) or the like, which supply an electronic component, on carriage 5, in accordance with a work instruction corresponding to a model of mounting board that is produced on component mounting lines L1 to L3 from the carriage. When tape feeder 9 is installed on carriage 5 connected to arrangement work supporting device 4, electric power is supplied to tape feeder 9 by arrangement work supporting device 4 via carriage 5 such that a feeder controller (not illustrated) that is internally provided in tape feeder 9 comes into a state of being capable of communicating with managing computer 3.

The worker includes a working device that performs the arrangement work of installing the plurality of tape feeders 9 or the like, which supply an electronic component, on carriage 5, in accordance with the work instruction corresponding to the model of mounting board to be produced, in addition to a person who performs work. The working device may be configured to complete the arrangement work inside the device or include an articulated robot that performs the arrangement work in a procedure close to a work procedure performed by a person outside the device. In addition, the number of workers may include only one or both the persons and the working devices.

Consequently, in managing computer 3, it is possible to acquire a state of arrangement work such as an installation state of tape feeder 9 to carriage 5 or a supply state of carrier tape 16 (refer to FIG. 4), in which the electronic component to be installed in tape feeder 9 is held, to tape feeder 9. In the arrangement work, carrier tape 16 is attached to tape feeder 9. Code reader 4a included in arrangement work supporting device 4 performs work of reading and checking information of barcode 17a (refer to FIG. 4) or the like on reel 17 that is housed in a state in which carrier tape 16 is wound. There is no need to provide one arrangement work supporting device 4 that is disposed in preparation area As, and two or more arrangement work supporting devices may be provided.

As described above, on carriages 5 in preparation area As, which include carriage 5 connected to arrangement work supporting device 4, it is possible to perform the arrangement work in parallel with the production of the mounting board in component mounting lines L1 to L3. When a model of mounting board to be produced in component mounting lines L1 to L3 is changed, the worker moves carriage 5, on which tape feeder 9 is installed in preparation area As, to component mounting lines L1 to L3 and performs replacement work of replacing carriage 5 installed in the component mounter.

Figure 2:
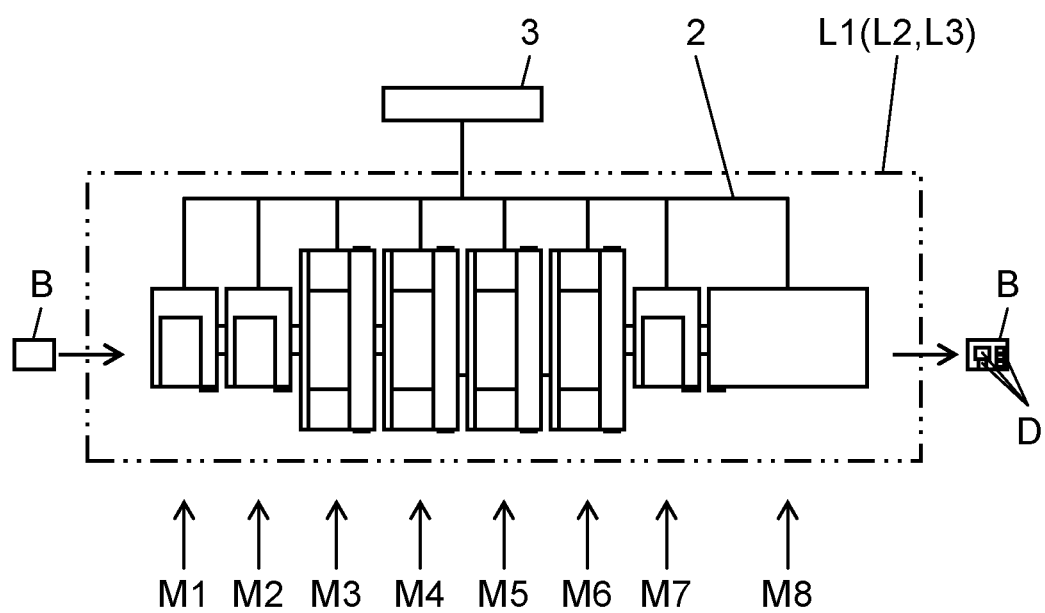
FIG. 2 is a diagram for illustrating a configuration of a component mounting line included in the component mounting system of the exemplary embodiment of the present disclosure.

Next, a detailed configuration of component mounting lines L1 to L3 will be described with reference to FIG. 2. Component mounting lines L1 to L3 have the same configuration as each other and, hereinafter, component mounting line L1 will be described. Component mounting line L1 has a configuration in which production equipment such as solder printing device M1, print inspecting device M2, component mounters M3 to M6, mounting inspecting device M7, and reflow device M8, are connected to each other in series from an upstream side (left side on the paper surface) to a downstream side (right side on the paper surface) in a board transporting direction. Component mounting line L1 is a production equipment group that is connected via communication network 2, and the pieces of production equipment may not be physically connected to each other.

Solder printing device M1, print inspecting device M2, component mounters M3 to M6, mounting inspecting device M7, and reflow device M8 are connected to managing computer 3 via communication network 2. Solder printing device M1 performs a solder printing job in which printing is performed with solder by a solder printing-job operator via a mask onto board B brought in from the upstream side. Print inspecting device M2 performs print inspecting work of inspecting a state of solder printed on board B by print inspecting work operator including a solder inspecting camera. A solder applicator that applies the solder on board B may be provided along with solder printing device M1 or instead of solder printing device M1. In addition, component mounting line L1 may not include print inspecting device M2.

Component mounters M3 to M6 perform component mounting work of mounting electronic component D on board B by a component mounting work operator. Component mounting line L1 is not limited to a configuration in which four component mounters M3 to M6 are provided, and one to three or five or more component mounters M3 to M6 may be provided. Mounting inspecting device M7 performs mounting inspecting work of inspecting a state of electronic component D mounted on board B by mounting inspecting work operator including a component inspecting camera. Reflow device M8 heats board B brought in the device by a board heater, causes the solder on board B to harden, and performs board heating work of bonding an electrode portion of board B to electronic component D. Component mounting line L1 may not include mounting inspecting device M7.

Next, a configuration of component mounters M3 to M6 will be described with reference to FIGS. 3 and 4. Component mounters M3 to M6 have the same configuration as each other and, here, component mounter M3 will be described. Component mounter M3 has a function of mounting electronic component D on board B. In FIG. 3, board transport mechanism 7 is disposed in an X direction at the center of base stand 6. Board transport mechanism 7 transports board B brought in from the upstream side in the X direction and positions and holds the board at a mounting working position by a mounting head to be described below. In addition, board transport mechanism 7 brings out board B, on which the component mounting work is ended, to the downstream side. Component suppliers 8 are disposed on both sides of board transport mechanism 7.

Carriage 5, on which the plurality of tape feeders 9 are installed side by side in the X direction, is attached to each of component supplier 8. Tape feeder 9 performs pitch feeding of the carrier tape provided with a pocket for housing electronic component D in a direction (tape feeding direction) from outside of component supplier 8 toward board transport mechanism 7, thereby supplying electronic component D to a component picking-up position at which the mounting head picks up electronic component D.

In FIG. 3, Y-axis tables 10 including a linear drive mechanism are disposed at both end portions of a top surface of base stand 6 in the X direction. Similarly, beam 11 including a linear mechanism is bonded to Y-axis table 10 so as to move freely in the Y direction. Mounting head 12 is installed on beam 11 so as to move freely in the X-axis direction. Mounting head 12 has a plurality of (here, eight) nozzle units 12a. In FIG. 4, each of the nozzle units 12a has a lower end portion provided with suction nozzle 12b that performs vacuum suction of electronic component D so as to hold the electronic component.

In FIG. 3, mounting head moving mechanism 13 is configured to include Y-axis table 10 and beam 11 and moves mounting head 12 in a horizontal direction (X direction and Y direction). Mounting head moving mechanism 13 and mounting head 12 perform the component mounting work in which suction nozzle 12b suctions and picks up electronic component D from the component picking-up position of tape feeder 9 installed in component supplier 8 and conveys and mounts the electronic component at a mounting position of board B held by board transport mechanism 7.

In FIGS. 3 and 4, head camera 14 that is positioned on an undersurface side of beam 11 so as to integrally move along with mounting head 12 is installed on beam 11. Mounting head 12 moves, and thereby head camera 14 moves above board B positioned at the mounting working position of board transport mechanism 7 so as to image a board mark (not illustrated) provided on board B. In this manner, a position of board B is recognized.

Component recognition camera 15 is disposed between component supplier 8 and board transport mechanism 7. When mounting head 12 that has taken out electronic component D from component supplier 8 moves above the component recognition camera, component recognition camera 15 images electronic component D held by suction nozzle 12b so as to recognize a holding position or the like. In the component mounting work of electronic component D to board B by mounting head 12, the mounting position is corrected with consideration for a recognition result of board B by head camera 14 and a recognition result of electronic component D by component recognition camera 15.

In FIG. 4, reel 17, around which carrier tape 16 housing electronic component D is wound, is held on a front side of carriage 5. Tape feeder 9 transports carrier tape 16, which is housed in reel 17, in a tape feeding direction, so as to supply electronic component D to a component picking-up position by mounting head 12.

As described above, component mounters M3 to M6 are the production equipment that produces mounting board on which electronic component D as a product is mounted, and component mounting lines L1 to L3 including component mounters M3 to M6 are production lines for producing the mounting board. Carriage 5 is arrangement means on which members (tape feeder 9 and reel 17) which are used in the production of the product (mounting board) are arranged. Carriage 5 is attached to component mounters M3 to M6 configuring component mounting lines L1 to L3 such that the members are arranged.

Next, a configuration of managing computer 3 will be described with reference to FIG. 5. Managing computer 3 includes inputter 29 and display 30, in addition to processor 20, production schedule storage 26, preparation work schedule storage 27, and worker information storage 28 which are storage devices. Processor 20 is a data processing device such as a CPU and includes schedule information acquirer 21, preparation time calculator 22, production time point calculator 23, schedule satisfaction determiner 24, and sequence changer 25 as internal processors. Managing computer 3 does not need to be configured of one computer and may be configured of a plurality of devices. For example, the entire or a part of storage device may include a cloud via a server.

Inputter 29 is an input device such as a keyboard, a touch panel, or a mouse and is used in an operating command, during data input, or the like. Display 30 is a display device such as a liquid crystal panel and displays various items of information such as an operating screen for an operation by inputter 29, as well as various items of data stored in the storages.

Figure 5:
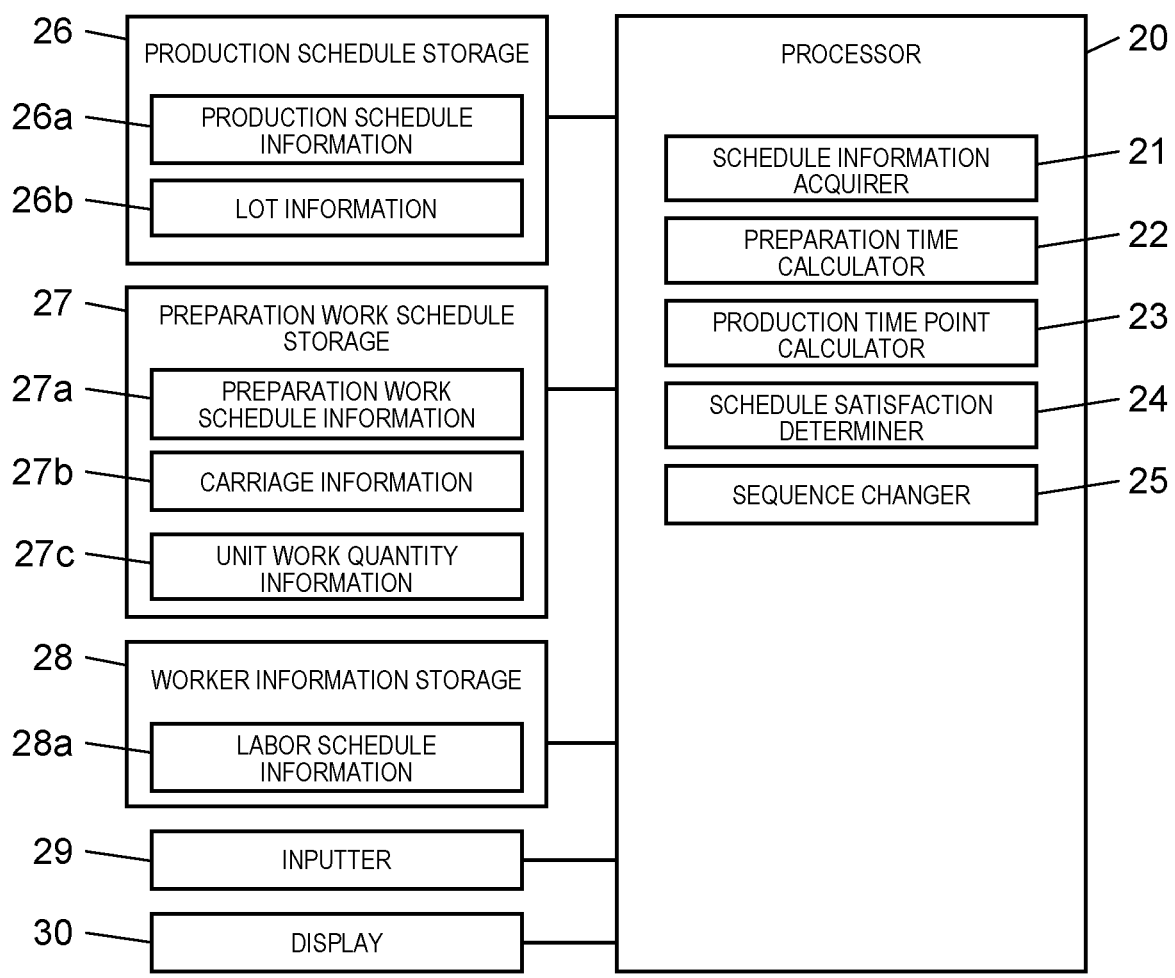
FIG. 5 is a block diagram illustrating a configuration of a managing computer (production schedule creating apparatus) of the exemplary embodiment of the present disclosure.

In FIG. 5, production schedule storage 26 stores production schedule information 26a, lot information 26b, or the like. In production schedule information 26a, a production schedule including a line number for identifying component mounting lines L1 to L3 that produce a mounting board, a production commencing time point and a production end time point, a commenceable time point when the production is commenceable, and a production deadline time point, a production sequence of the mounting board, or the like is stored for each lot number for identifying a lot of the mounting board to be produced. In other words, production schedule information 26a includes a production sequence for producing the plurality of models (lots) of products (mounting boards) and a commenceable time point when production is commenceable and a production deadline time point for each model. The commenceable time point is a time point when all of the members for the production of a model are arranged.

In lot information 26b, a model number for identifying a model of the mounting board, a group number for identifying a production group that collectively includes produceable models produced by arrangement of the same members in component mounting lines L1 to L3, the number of members (tape feeder 9 and reel 17) that are used in the production of the model, the number of mounting boards to be produced, or the like is stored for each lot number for identifying the lot of the mounting board to be produced.

Here, an example of lot information 26b is described with reference to FIG. 6. Lot information 26b includes lot number 41, model number 42, group number 43, number-of-members 44, and number-of-production 45. Lot number 41 is information for identifying a lot of the mounting board to be produced in component mounting lines L1 to L3. Model number 42 is information for identifying a model of the mounting board. Group number 43 is information for identifying the production group. Number-of-members 44 is the number of members that are used in production of the model. Number-of-production 45 is the number of mounting boards to be produced of each lot. In this example, lot A and lot C are included in the same group G1, and lot F and lot G are included in the same production group G5.

In FIG. 5, preparation work schedule storage 27 stores preparation work schedule information 27a, carriage information 27b, unit work quantity information 27c, or the like. In preparation work schedule information 27a, the start time point and the end time point of the arrangement work of arranging members (tape feeder 9 and reel 17) corresponding to a model on carriage 5 (arrangement means) or preparation time (time from the start time point to the end time point of the arrangement work) taken for the arrangement work is stored for each model of the mounting board. In carriage information 27b, a carriage group number for identifying the plurality of carriages 5 which are simultaneously attached to component mounting lines L1 to L3 and used in the production of the mounting boards, a carriage number for identifying carriage 5, the number of tape feeders 9 that can be mounted, or the like is stored. In unit work quantity information 27c, a unit work quantity of each work is stored for each work content of the arrangement work.

Here, an example of unit work quantity information 27c is described with reference to FIG. 7. Unit work quantity information 27c includes work content 51 and unit work quantity 52. Work content 51 is the work content of the arrangement work. Unit work quantity 52 is the unit work quantity of each work and time (minute) taken in a case where one worker performs work. Work having work content 51 as "detaching of the tape feeder from the carriage" is work of detaching installed tape feeder 9 and reel 17 from carriage 5, and unit work is work of detaching one tape feeder 9 and reel 17 housing carrier tape 16, which is supplied to tape feeder 9, from carriage 5.

Work of "attaching the tape feeder to the carriage" is work of installing tape feeder 9 and reel 17 to carriage 5, and unit work is work of attaching one tape feeder 9 and reel 17 housing carrier tape 16, which is supplied to tape feeder 9, to carriage 5. Work of "checking the tape feeder and reel" is work of reading barcode 17a of reel 17 installed on carriage 5 by code reader 4a and checking that installed reel 17 matches a reel in the work instruction, and unit work is checking work of one reel 17.

In FIG. 5, worker information storage 28 stores labor schedule information 28a or the like. Labor schedule information 28a includes the number of workers, who work on floor F, or the like for each production time point. Processor 20 performs a production schedule creating process of creating a production schedule that satisfies a schedule satisfying condition. Here, the schedule satisfying condition means that the production commencing time point of each lot is later than the commenceable time point and the production end time point thereof is earlier than the production deadline time point. Schedule information acquirer 21 acquires production schedule information 26a including the production sequence, the commenceable time point for each model (lot), and the production deadline time point.

Preparation time calculator 22 calculates preparation time taken to perform the arrangement work for each model (lot), based on production schedule information 26a, lot information 26b, carriage information 27b, unit work quantity information 27c, and labor schedule information 28a. More specifically, preparation time calculator 22 assigns a lot (model) of the mounting board to be produced to a carriage group based on the production sequence. Preparation time calculator 22 assigns the carriage group for each production group in a case where a lot that belongs to the same production group is present. Subsequently, preparation time calculator 22 calculates the work quantity required for the arrangement work from number-of-members 44 and unit work quantity 52 and calculates the preparation time by dividing the calculated work quantity by the number of workers who can work at the production time point. Preparation time calculator 22 stores the calculated preparation time in preparation work schedule information 27a.

Here, examples of the production sequence included in production schedule information 26a and the preparation time calculated by preparation time calculator 22 are described with reference to FIG. 8. In these examples, the members (tape feeder 9 and reel 17) are arranged on carriages 5 of three carriage groups such that the mounting board is produced in two component mounting lines L1 and L2.

In line numbers "L1" and "L2", a production schedule of lots in each of component mounting line L1 and component mounting line L2 is illustrated along a production time point. In component mounting line L1, lot A, lot C, and lot E of production group G1 are scheduled to be produced in this sequence. In component mounting line L2, lot B and lot D and lot F and lot G of production group G5 are scheduled to be produced in this sequence. A position of a front side (left end in the drawing) of a rectangle indicating each of the lots represents the production commencing time point, and a position of a rear side (right end in the drawing) thereof represents the production end time point.

Figure 8:
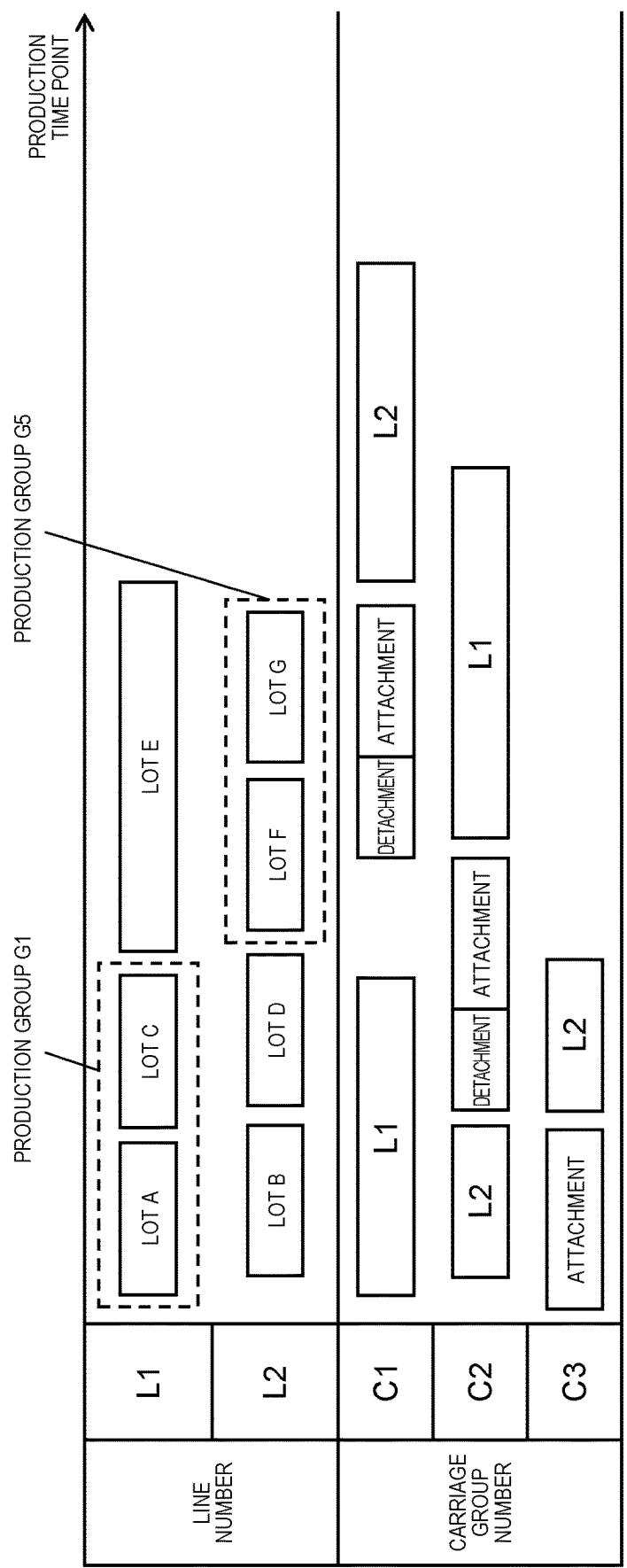
FIG. 8 is a diagram for illustrating steps of creating a production schedule by the managing computer (production schedule creating apparatus) of the exemplary embodiment of the present disclosure.

In FIG. 8, in each of carriage group numbers "C1", "C2", and "C3", a sequence and preparation time of the arrangement work in carriage group C1, carriage group C2, and carriage group C3 and component mounting lines L1 and L2 to be attached are shown along the production time point. In the arrangement work, "detachment" indicates the detachment work of tape feeder 9 from carriage 5, and "attachment" indicates attachment work of tape feeder 9 to carriage 5 and checking work of reel 17. A length of the arrangement work along the production time point represents the preparation time. A position of a front side (left end in the drawing) of a rectangle indicating the preparation time in carriage groups each of the lots represents the start time point of the arrangement work, a position of a rear side (right end in the drawing) thereof represents the end time point of the arrangement work, and a length of the rectangle represents the preparation time.

In this example, preparation time calculator 22 calculates the preparation time in a condition that only the arrangement work on one of carriage groups C1 to C3 can be performed simultaneously. In addition, arrangement work of production group G1 on carriage group C1 and arrangement work of lot B on carriage group C2 are ended by a scheduled production commencing time point.

In FIG. 5, production time point calculator 23 calculates the production commencing time point and the production end time point for each model, based on the production sequence and the preparation time. More specifically, production time point calculator 23 calculates the production commencing time point and the production end time point for each model (lot) in a condition that production is started in assigned component mounting lines L1 and L2 when the arrangement work of members on carriage groups C1 to C3 assigned to the lots is ended in accordance with the production sequence included in production schedule information 26a. Production time point calculator 23 stores the calculated production commencing time point and production end time point in production schedule information 26a.

Here, the production commencing time point and the production end time point calculated by production time point calculator 23, based on the production sequence and the preparation time illustrated in FIG. 8 are described with reference to FIG. 9. The arrangement work of lot D on carriage group C3 is ended by the scheduled production commencing time point of lot D, and thus the production commencing time point and the production end time point of lot D are not changed from those in FIG. 8. The arrangement work of lot E on carriage group C2 is not ended by the scheduled production commencing time point of lot E, and thus the production commencing time point of lot E is delayed until the arrangement work on carriage group C2 is ended. The production end time point of lot E is also changed depending on the delayed production commencing time point. Consequently, waiting time T1 is provided from the production end time point of lot C to the production commencing time point of lot E.

Similarly, the production commencing time point of lot F of production group G5 is also delayed until the arrangement work on carriage group C1 is ended. Consequently, the production end time point of lot F and the production commencing time point and the production end time point of lot G are changed, and waiting time T2 is provided from the production end time point of lot D to the production commencing time point of lot F. In this example, waiting time T2 of lot F is longer than waiting time T1 of lot E.

In FIG. 5, schedule satisfaction determiner 24 determines whether or not a schedule satisfying condition that the production commencing time point included in production schedule information 26a is later than the commenceable time point and the production end time point is earlier than the production deadline time point is satisfied, for each model (lot). In a case where the unsatisfied model that does not satisfy the schedule satisfying condition is present, sequence changer 25 changes a sequence for producing an unsatisfied model depending on content of unsatisfactoriness or situations of component mounting lines L1 to L3. In addition, in a case where all of the models (lots) satisfy the schedule satisfying condition, sequence changer 25 changes a sequence for producing a model having a long waiting time from the production end time point of a model produced previously in the production sequence to the production commencing time point of the model.

When sequence changer 25 changes the production sequence, preparation time calculator 22 re-calculates preparation time in the changed production sequence, production time point calculator 23 recalculates the production commencing time point and the production end time point, and schedule satisfaction determiner 24 determines whether or not the schedule satisfaction condition is satisfied. As described above, the change of the production sequence and the satisfaction determination of the schedule satisfying condition are repeated such that a production schedule in which all of the models satisfy the schedule satisfying condition is created. Further, the production sequence of the model having the waiting time is changed such that a production schedule having high production efficiency is created.

Figure 10:
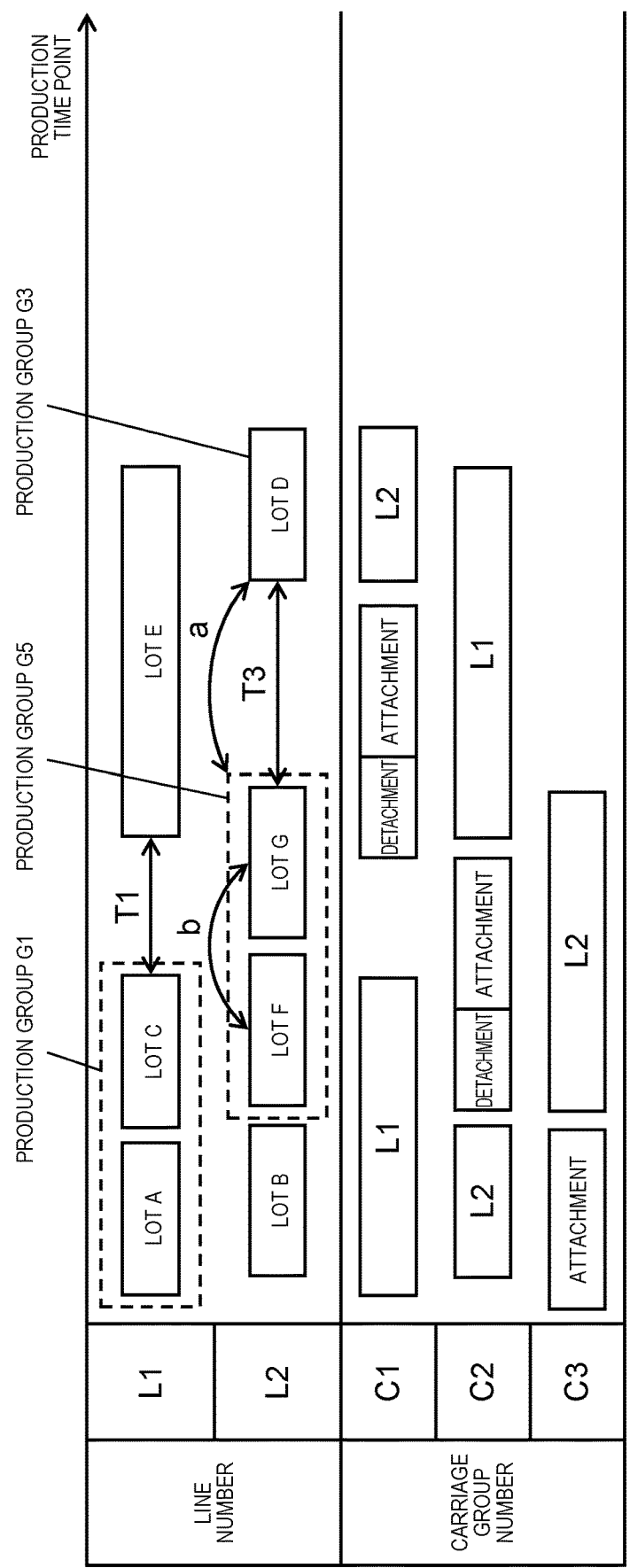
FIG. 10 is a diagram for illustrating steps of creating a production schedule by the managing computer (production schedule creating apparatus) of the exemplary embodiment of the present disclosure.
Figure 11:
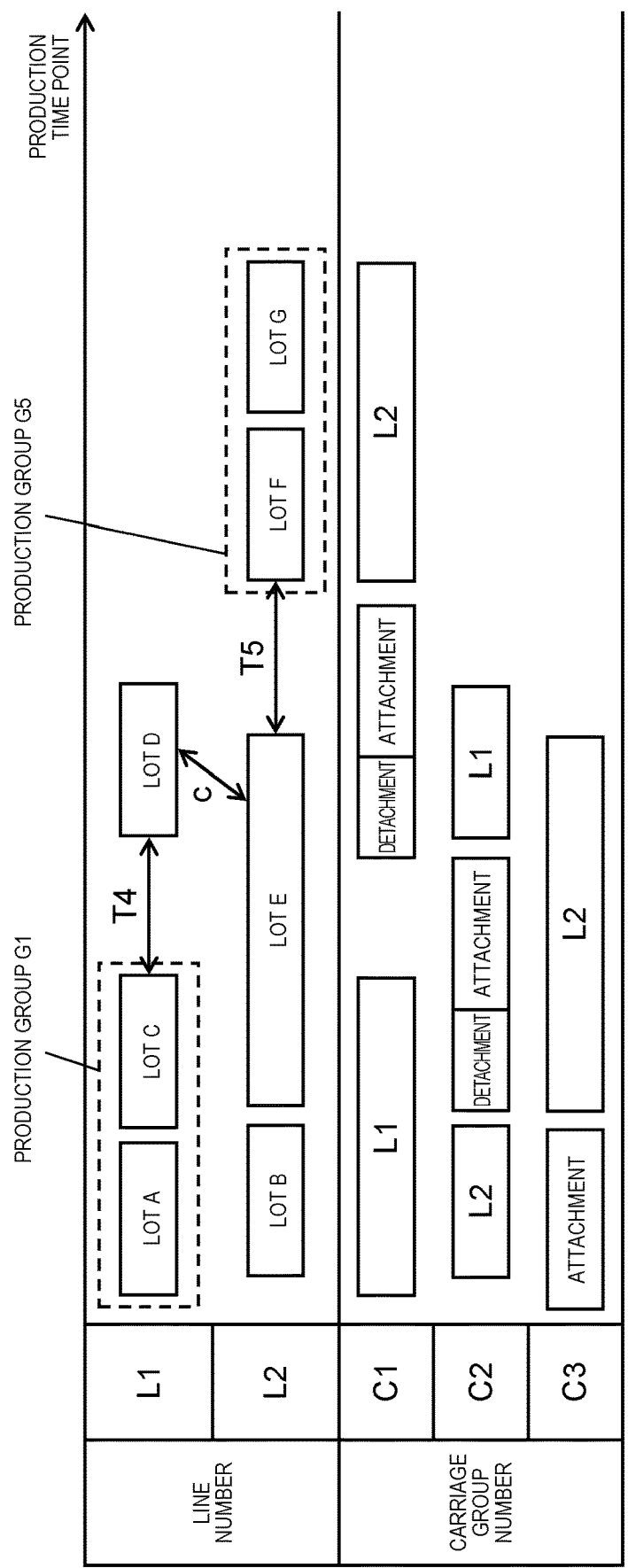
FIG. 11 is a diagram for illustrating steps of creating a production schedule by the managing computer (production schedule creating apparatus) of the exemplary embodiment of the present disclosure.

Next, an example of the change of the production sequence by sequence changer 25 will be described with reference to FIGS. 10 and 11. FIGS. 10 and 11 illustrate an example in which sequence changer 25 changes the production sequence based on a determination result of the schedule satisfying condition by schedule satisfaction determiner 24 with respect to the production schedule illustrated in FIG. 9. In FIG. 9, waiting time T2 is provided to lot F, and thereby a production end time point of lot G planned to be produced after lot F is also delayed. In a case where the production end time point of lot G is delayed to be later than the production deadline time point, schedule satisfaction determiner 24 determines that lot G is an unsatisfied model.

In this respect, sequence changer 25 interchanges a production sequence of lot G which is the unsatisfied model, together with lot F which belongs to the same production group G5, with a production sequence of lot D that is to be produced earlier in the production sequence (arrow a in FIG. 10). Waiting time T3 from the production end time point of lot G after interchanging to the production commencing time point of lot D is more shortened than waiting time T2 of lot F before interchanging.

As described above, in a case where the production end time point of the unsatisfied model (lot F) is later than the production deadline time point, sequence changer 25 changes the sequence for producing the unsatisfied model (lot F) to the sequence of another model (lot D) that is to be produced earlier in the production sequence. In addition, the production sequence is a sequence of production groups including the plurality of models (lots) collectively, and sequence changer 25 changes a sequence of the production group (production group G5) including the unsatisfied model (lot F) to a sequence of another production group (production group G3).

In FIG. 10, in a case where planned production time of lot F is advanced, and thereby the changed production commencing time of lot F is earlier than the commenceable time point, schedule satisfaction determiner 24 determines that the lot F after changing is the unsatisfied model. In this respect, sequence changer 25 interchanges a production sequence of lot F after the changing, which is the unsatisfied model, with a production sequence of lot G that is to be produced later in the production sequence and belongs to the same production group G5 (arrow b in FIG. 10).

As described above, in a case where the production commencing time point of the unsatisfied model (lot F after the changing) is earlier than the commenceable time point, sequence changer 25 changes the sequence for producing the unsatisfied model (lot F after the changing) to the sequence of the other model (lot G) that is to be produced later in the production sequence. In addition, sequence changer 25 changes the sequence for producing the unsatisfied model (lot F after the changing) to the sequence of the other model (lot G) in the production group (production group G5) including the unsatisfied model (lot F after the changing).

Figure 9:
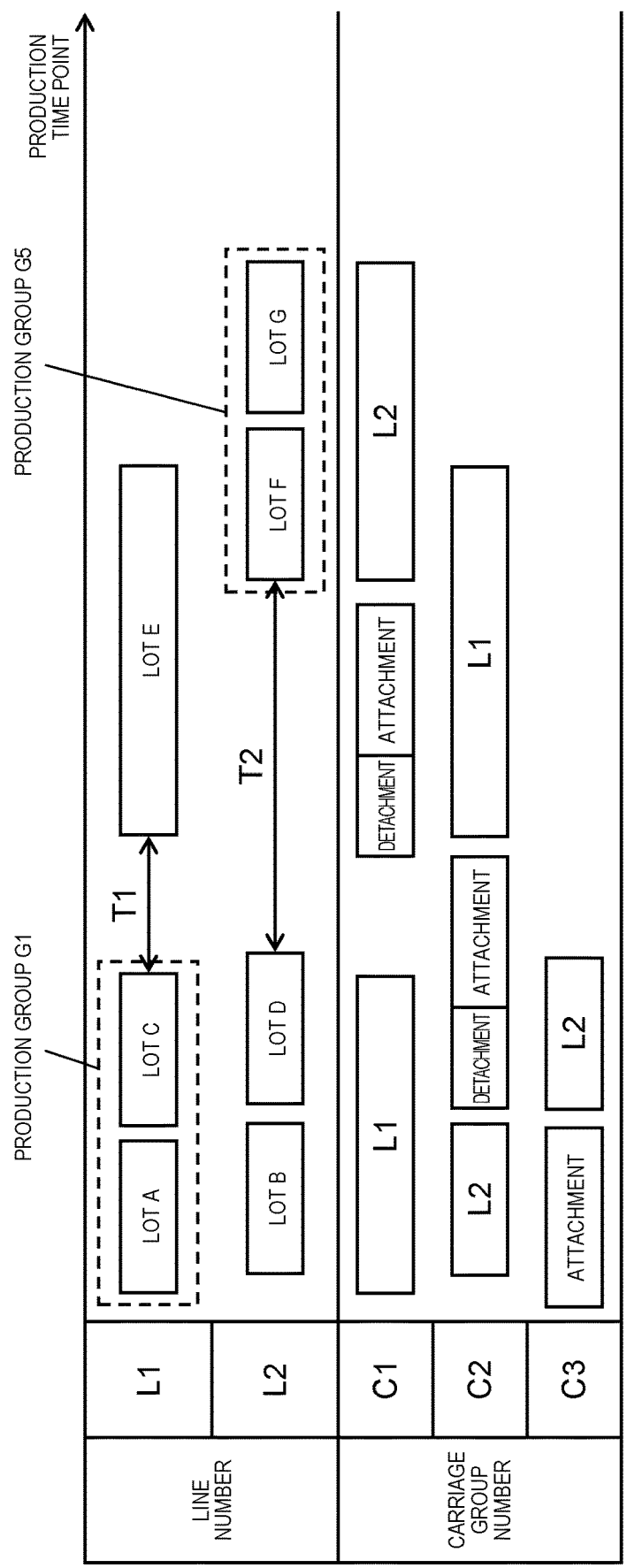
FIG. 9 is a diagram for illustrating steps of creating a production schedule by the managing computer (production schedule creating apparatus) of the exemplary embodiment of the present disclosure.

In FIG. 9, in a case where waiting time T1 is provided to lot E, and thereby the production end time point of lot E is delayed to be later than the production deadline time point, schedule satisfaction determiner 24 determines that lot E is an unsatisfied model. In this respect, sequence changer 25 interchanges a production sequence of lot E, which is the unsatisfied model, with a production sequence of lot D that is planned to be produced in the other component mounting line L2 (arrow c in FIG. 11). As described above, in a case where a product (mounting board) is produced in a plurality of production lines (component mounting lines L1 and L2), sequence changer 25 changes the production line (component mounting line L1) for producing the unsatisfied model (lot E) to the other production line (component mounting line L2).

In FIG. 11, lot D is interchanged with lot E, and thereby waiting time T4 is provided from the production end time point of lot C to the production commencing time point of lot D after the interchanging. In addition, waiting time T5 is provided from the production end time point of lot E after the interchanging to the production commencing time point of lot F. In this example, waiting time T5 of lot F after the interchanging is more shortened than waiting time T2 of lot F before interchanging.

The change of the production sequence by sequence changer 25 described above is an example of a case where the schedule satisfying condition is not satisfied; however, in a case where the schedule satisfying condition is satisfied, the same is true of the change of the production sequence which is performed to shorten the waiting time, and thus the detailed description thereof is omitted. For example, waiting time T3 of lot D after the changing illustrated in FIG. 10, that is, after sequence changer 25 changes the production sequence, and waiting time T5 of lot F after the changing illustrated in FIG. 11 are more shortened than waiting time T2 of lot F illustrated in FIG. 9.

Figure 12:
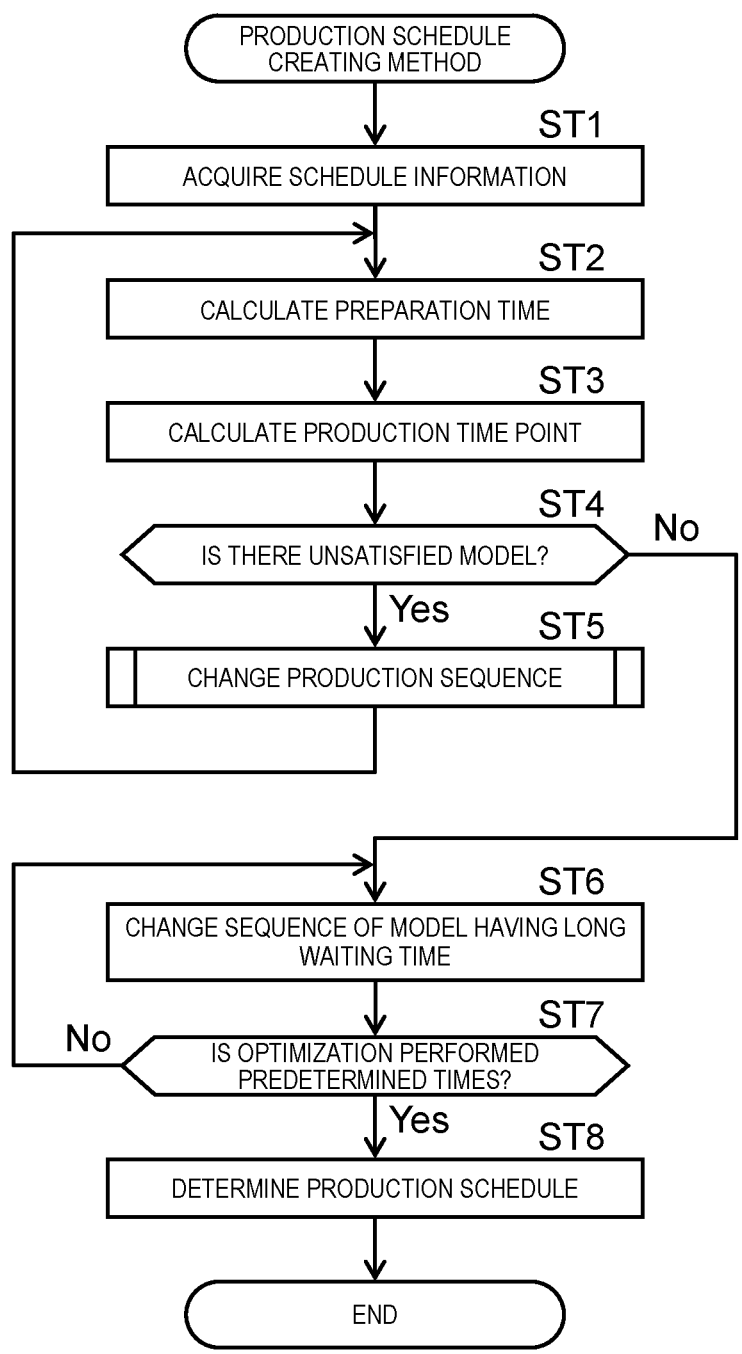
FIG. 12 is a flowchart of a production schedule creating method in the managing computer (production schedule creating apparatus) of the exemplary embodiment of the present disclosure.
Figure 13:
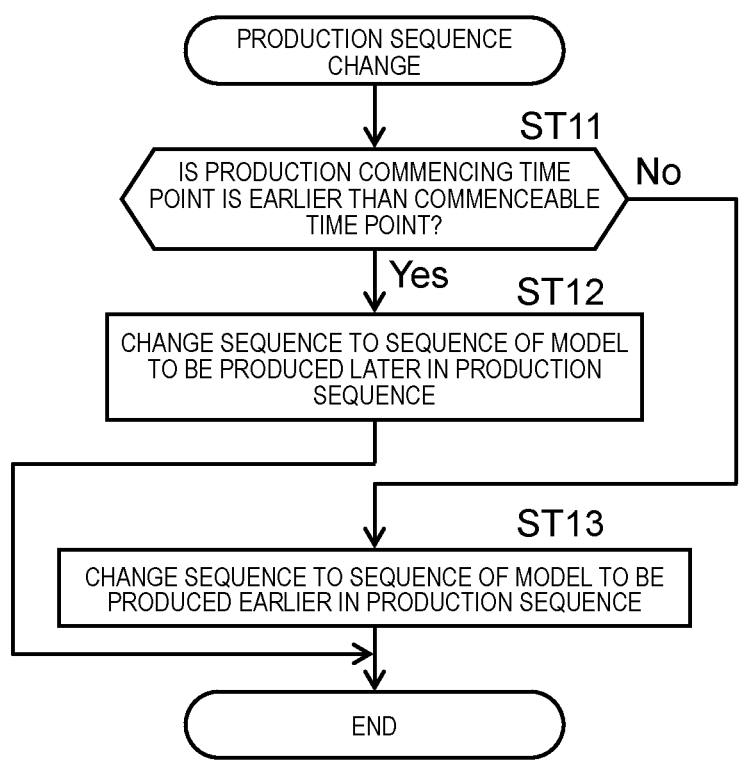
FIG. 13 is a flowchart of a production sequence change in the managing computer (production schedule creating apparatus) of the exemplary embodiment of the present disclosure.

Next, a production schedule creating method used in managing computer 3 (production schedule creating apparatus) that creates the production schedule in the production lines (component mounting lines L1 to L3) for producing the plurality of models of products (mounting boards) will be described along a flow in FIGS. 12 and 13. In FIG. 12, first, schedule information acquirer 21 acquires production schedule information 26a including the production sequence and the commenceable time point for each model (lot), and the production deadline time point (ST1; schedule information acquiring step). Subsequently, preparation time calculator 22 calculates the preparation time taken to perform the arrangement work for each model (lot), based on the production schedule (ST2: preparation time calculating step). The calculated preparation time is stored in preparation work schedule information 27a.

Subsequently, production time point calculator 23 calculates the production commencing time point and the production end time point for each model (lot), based on the production sequence and the preparation time (ST3: production time point calculating step). The calculated production commencing time point and the production end time point are stored in production schedule information 26a. Subsequently, schedule satisfaction determiner 24 determines whether or not the schedule satisfying condition that the production commencing time point is later than the commenceable time point and the production end time point is earlier than the production deadline time point is satisfied (whether or not the unsatisfied model that does not satisfy the schedule satisfying condition is present), for each model (lot) (ST4: schedule satisfaction determining step). In a case where the unsatisfied model is present (Yes in ST4), sequence changer 25 changes the sequence for producing the unsatisfied model (ST5: sequence changing step). The changed production sequence is stored in production schedule information 26a.

In FIG. 12, when the production sequence is changed, the preparation time calculating step (ST2), the production time point calculating step (ST3), and the schedule satisfaction determining step (ST4) are performed, based on the changed sequence. In other words, the sequence changing step (ST5) is repeatedly performed until all of the models (lots) satisfy the schedule satisfying condition. In a case where the unsatisfied model that does not satisfy the schedule satisfying condition is present in the schedule satisfaction determining step (ST4) even when the sequence changing step (ST5) is repeated predetermined times, a notification that it is not possible to create a production schedule that satisfies the schedule satisfying condition may be displayed on display 30.

In a case where the unsatisfied model is not present in all of the models (No in ST4), optimization of changing the production sequence such that the waiting time is shortened is performed with respect to the model (lot) having a long waiting time (ST6: optimizing step). In the optimizing step (ST6), the sequence changing step (ST5) is performed with respect to the model having the long waiting time. The same processes as the preparation time calculating step (ST2), the production time point calculating step (ST3), and the schedule satisfaction determining step (ST4) are performed with respect to all of the models, and waiting time after changing is calculated. In a case where the waiting time after the changing is more shortened than that before the changing, the changed production sequence is stored in production schedule information 26a.

Even when the unsatisfied model is present in the schedule satisfaction determining step (ST4) such as a case where the unsatisfied model is present even though the sequence changing step (ST5) is repeated predetermined times (Yes), the optimizing step (ST6) may be performed. In this case, in the optimizing step (ST6), the sequence changing step (ST5) is performed with respect to the model having the long waiting time and the unsatisfied model. The same processes as the preparation time calculating step (ST2), the production time point calculating step (ST3), and the schedule satisfaction determining step (ST4) are performed with respect to all of the models, and the waiting time after changing is calculated.

In a case where the waiting time is shortened, and thereby the schedule satisfying condition is to be satisfied (No in ST4), the changed production sequence is stored in production schedule information 26a. In a case where the schedule satisfying condition is not satisfied even when the optimizing step (ST6) is repeated predetermined times, a notification that it is not possible to create a production schedule that satisfies the schedule satisfying condition may be displayed on display 30.

In other words, in a case where all of the models (lots) satisfy the schedule satisfying condition (No in ST4), sequence changer 25 changes a sequence (production sequence) for producing a model having a long waiting time from the production end time point of a model (lot) produced previously in the production sequence to the production commencing time point of the model (ST6). The changed production sequence is stored in production schedule information 26a. When the optimizing step (ST6) is repeatedly performed predetermined times (Yes in ST7), the production schedule is determined to the production sequence stored in production schedule information 26a (ST8: production schedule determining step).

Next, the sequence changing step (ST5) will be described in detail with reference to FIG. 13. In a case where the production commencing time point of the unsatisfied model is earlier than the commenceable time point (Yes in ST11), sequence changer 25 changes the sequence for producing the unsatisfied model to the sequence of the other model that is to be produced later in the production sequence in the sequence changing step (ST5) (ST12). In a case where the production end time point of the unsatisfied model is later than the production deadline time point (No in ST11), sequence changer 25 changes the sequence for producing the unsatisfied model to the sequence of the other model that is to be produced earlier in the production sequence in the sequence changing step (ST5) (ST13).

In addition, in a case where the product (mounting board) is produced in the plurality of production lines (component mounting lines L1 to L3), sequence changer 25 changes the production line for producing the unsatisfied model to another production line in the sequence changing step (ST5) (arrow c in FIG. 11). In addition, sequence changer 25 changes the sequence of the production group including the unsatisfied model to a sequence of another production group in the sequence changing step (ST5) (arrow a in FIG. 10). In addition, sequence changer 25 changes the sequence for producing the unsatisfied model to a sequence of another model in the production group including the unsatisfied model in the sequence changing step (ST5) (arrow b in FIG. 10).

As described above, sequence changer 25 changes the production sequence depending on a situation of the model (lot) such as a reason that the schedule satisfying condition is not satisfied, situations of component mounting lines L1 to L3 to perform production, a configuration of the production group in the sequence changing step (ST5). Consequently, it is possible to create the production schedule for producing the plurality of models (lots) of products (mounting boards) satisfying the limiting condition such as the schedule satisfying condition.

As described above, managing computer 3 of the exemplary embodiment is the production schedule creating apparatus that creates the production schedule. Managing computer 3 includes schedule information acquirer 21 that acquires production schedule information 26a including the production sequence for producing the plurality of models (lots) of products (mounting boards), the commenceable time point for each model and the production deadline time point, and preparation time calculator 22 that calculates the preparation time taken for the arrangement work of arranging the members (tape feeder 9 and reel 17) corresponding to the model on the arrangement means (carriage 5) based on the production sequence, for each model. Further, managing computer 3 includes production time point calculator 23 that calculates the production commencing time point and the production end time point for each model, based on the production sequence and the preparation time, schedule satisfaction determiner 24 that determines whether or not the schedule satisfying condition is satisfied, for each model, and sequence changer 25 that changes the sequence for producing the unsatisfied model, in a case where the unsatisfied model that does not satisfy the schedule satisfying condition is present.

Consequently, it is possible to create the production schedule for producing the plurality of models (lots) of products (mounting boards) satisfying the limiting condition such as the schedule satisfying condition.

As described above, the description is provided based on the exemplary embodiments of the present disclosure. Various modification examples can be made from the embodiments by combining the types of products which are produced in the production lines, and thus those skilled in the art understand that the modification examples are also included within the scope of the present disclosure. For example, the production line may be a home appliance production line through which home appliances as products are assembled or may be a food processing line through which a food processing product as a product is manufactured.

In the present disclosure, the production schedule creating method and the production schedule creating apparatus achieve an effect in that it is possible to create the production schedule for producing the plurality of models of products satisfying the limiting condition and are used in a field of mounting an electronic component on a board.

What is claimed is:

1. A production schedule creating method used in a production schedule creating apparatus that creates a production schedule in a production line for producing a plurality of models of products, the method comprising:
a schedule information acquiring step of acquiring production schedule information including a production sequence for producing the plurality of models of products, a commenceable time point when production of the plurality of models of products is commenceable, and a production deadline time point;

a preparation time calculating step of calculating a preparation time taken for arrangement work of arranging members corresponding to the plurality of models on arrangement means which is attached to the production line so as to arrange the members that are used for production of the products, for each of the plurality of models, based on the production sequence;

a production time point calculating step of calculating a production commencing time point and a production end time point for each of the plurality of models, based on the production sequence and the preparation time;

a schedule satisfaction determining step of determining whether or not a schedule condition is satisfied for each of the plurality of models, the schedule condition being satisfied when the production commencing time point is later than the commenceable time point and the production end time point is earlier than the production deadline time point; and after determining that an unsatisfied model, a model in which the schedule condition is not satisfied, is present, a sequence changing step of changing a sequence of the unsatisfied model in the production sequence so that the unsatisfied model satisfies the schedule condition.

2. The production schedule creating method of claim 1, wherein, in a case where the production commencing time point of the unsatisfied model is earlier than the commenceable time point, the sequence of the unsatisfied model is interchanged with a sequence of a model to be produced later in the production sequence, in the sequence changing step.

3. The production schedule creating method of claim 1, wherein, in a case where the production end time point of the unsatisfied model is later than the production deadline time point, the sequence of the unsatisfied model is interchanged with a sequence of a model to be produced earlier in the production sequence, in the sequence changing step.

4. The production schedule creating method of claim 1, wherein, in a case where the products are produced in a plurality of the production lines, a production line for producing the unsatisfied model is changed from a first production line to a second production line in the sequence changing step.

5. The production schedule creating method of claim 1, wherein the production sequence includes a sequence of a first production group and a second production group, each of the first production group and the second production group including at least two of the plurality of models, and wherein the first production group includes the unsatisfied model, and wherein the sequence of the first production group is interchanged with a sequence of the second production group in the sequence changing step.

6. The production schedule creating method of claim 1, wherein the production sequence includes a production group including at least two of the plurality of models, and wherein the at least two of the plurality of models includes the unsatisfied model, and wherein the sequence of the unsatisfied model is interchanged with a sequence of another of the at least two of the plurality of models in the production group, in the sequence changing step.

7. The production schedule creating method of claim 1, wherein, in a case where all of the plurality of models satisfy the schedule condition, a sequence of a first model of the plurality of models having a longest waiting time between a production end time point of a second model produced previously in the production sequence to a production commencing time point of the first model is changed in the sequence changing step.

8. The production schedule creating method of claim 1, wherein the products are mounting boards on which an electronic component is mounted, and wherein the production line is a component mounting line.

9. The production schedule creating method of claim 1, further comprising, repeating the schedule satisfaction determining step and the sequence changing step until the schedule satisfaction determining step determines that the schedule condition is satisfied for each of the plurality of models.

10. A production schedule creating apparatus that creates a production schedule in a production line for producing a plurality of models of products, the apparatus comprising:

a schedule information acquirer that acquires production schedule information including a production sequence for producing the plurality of models of products, a commenceable time point when production of the plurality of models is commenceable, and a production deadline time point;

a preparation time calculator that calculates a preparation time taken for arrangement work of arranging members corresponding to the plurality of models on arrangement means which is attached to the production line so as to arrange the members that are used for production of the products, for each of the plurality of models, based on the production sequence;

a production time point calculator that calculates a production commencing time point and a production end time point for each of the plurality of models, based on the production sequence and the preparation time;

a schedule satisfaction determiner that determines whether or not a schedule condition is satisfied for each of the plurality of models, the schedule condition being satisfied when the production commencing time point is later than the commenceable time point and the production end time point is earlier than the production deadline time point; and after determining that an unsatisfied model, a model in which the schedule condition is not satisfied, is present, a sequence changer that changes a sequence of the unsatisfied model in order to satisfy the schedule condition.

11. The production schedule creating apparatus of claim 10, wherein, in a case where the production commencing time point of the unsatisfied model is earlier than the commenceable time point, the sequence changer interchanges the sequence of the unsatisfied model with a sequence of a model to be produced later in the production sequence.

12. The production schedule creating apparatus of claim 10, wherein, in a case where the production end time point of the unsatisfied model is later than the production deadline time point, the sequence changer interchanges the sequence of the unsatisfied model with a sequence of a model to be produced earlier in the production sequence.

13. The production schedule creating apparatus of claim 10, wherein, in a case where the products are produced in a plurality of the production lines, the sequence changer changes a production line for producing the unsatisfied model from a first production line to a second production line.

14. The production schedule creating apparatus of claim 10,
wherein the production sequence includes a sequence of a first production group and a second production group, the first production group including the unsatisfied model, and
wherein the sequence changer interchanges the sequence of the first production group with the second production group.

15. The production schedule creating apparatus of claim 10,
wherein the production sequence includes a production group including at least two of the plurality of models, including the unsatisfied model, and
wherein the sequence changer interchanges the sequence of the unsatisfied model with a sequence of model of the at least two of the plurality of models in the production group.

16. The production schedule creating apparatus of claim 10,
wherein, in a case where all of the plurality of models satisfy the schedule condition, a sequence for producing a first model of the plurality of models having a longest waiting time between a production end time point of a second model produced previously in the production sequence to a production commencing time point of the first model is changed in the sequence changing step.

17. The production schedule creating apparatus of claim 10,
wherein the products are mounting boards on which an electronic component is mounted, and
wherein the production line is a component mounting line.

18. The production schedule creating apparatus of claim 10, wherein the schedule satisfaction determiner repeats determining whether or not the schedule condition is satisfied for each of the plurality of models, and the sequence changer repeats changing the sequence of the unsatisfied model until the schedule satisfaction determiner determines that the schedule condition is satisfied for each of the plurality of models.

* * * * *